(12) United States Patent
Voigt et al.

(10) Patent No.: US 7,294,817 B2
(45) Date of Patent: Nov. 13, 2007

(54) SYSTEM AND METHODS FOR DETERMINING NONUNIFORMITY CORRECTION PARAMETERS IN DETECTOR-ARRAY IMAGING

(75) Inventors: Matthias Voigt, Princeton, NJ (US); Martin Zarzycki, Grevenbroich (DE); Hans-Gerd Brummel, Orlando, FL (US); Dennis H. Lemieux, Casselberry, FL (US); Visvanathan Ramesh, Plainsboro, NJ (US)

(73) Assignee: Siemens Power Generation, Inc., Orlando, FL (US)

( * ) Notice: Subject to any disclaimer, the term of this patent is extended or adjusted under 35 U.S.C. 154(b) by 229 days.

(21) Appl. No.: 11/122,568

(22) Filed: May 5, 2005

(65) Prior Publication Data

US 2005/0247867 A1   Nov. 10, 2005

Related U.S. Application Data

(60) Provisional application No. 60/568,524, filed on May 6, 2004, provisional application No. 60/568,523, filed on May 6, 2004.

(51) Int. Cl.
    *H01L 27/00* (2006.01)

(52) U.S. Cl. .................. 250/208.1; 348/164; 348/615; 382/175

(58) Field of Classification Search ............. 250/208.1; 348/164, 166, 615; 382/275; 341/139; 264/515, 264/517
See application file for complete search history.

(56) References Cited

U.S. PATENT DOCUMENTS

| 4,298,887 | A | 11/1981 | Rode |
| 4,975,864 | A | 12/1990 | Sendall et al. |
| 5,811,808 | A | 9/1998 | Cannata et al. |
| 6,268,883 | B1 | 7/2001 | Zehnder et al. |
| 6,324,308 | B1 * | 11/2001 | Chen et al. .................. 382/275 |
| 2005/0157942 | A1 * | 7/2005 | Chen et al. .................. 382/275 |

* cited by examiner

Primary Examiner—Georgia Epps
Assistant Examiner—Patrick J. Lee (57) ABSTRACT

An imaging system (110) for imaging a scene with a detector array (104) having an array of imaging elements is provided. The imaging system (110) includes an image estimation module (202) for generating a plurality estimates of uncorrupted images based upon a plurality of noisy images generated by the detector array (104). The imaging system (110) further includes a parameter determination module (204) for determining one or more nonuniformity correction parameters based upon the estimates of uncorrupted images.

20 Claims, 5 Drawing Sheets

SYSTEM AND METHODS FOR DETERMINING NONUNIFORMITY CORRECTION PARAMETERS IN DETECTOR-ARRAY IMAGING

CROSS REFERENCE TO RELATED APPLICATIONS

This application claims priority to U.S. Provisional Patent Application No. 60/568,523, which was filed May 6, 2004, and to U.S. Provisional Patent Application No. 60/568,524, which also was filed May 6, 2004.

FIELD OF THE INVENTION

The present invention is directed to imaging systems, and, more particularly, to detector-array imaging.

BACKGROUND OF THE INVENTION

A detector array is a combination of individual detectors that are typically arranged in a lattice-like array. The individual detectors of the array are often referred to as the array elements or pixels—a short-hand phrase for picture elements. Each pixel converts the energy from infrared or other electromagnetic (em) radiation into electrical signals. Various techniques for processing these electrical signals often involve quantizing the electrical signals so that they can be represented in digital form.

An example of a detector array is the focal-plane array (FPA), which comprises optics and infrared or visible-light sensor elements for imaging objects or scenes. The FPA is typically constructed as a grid of independent photodetectors that are arrayed in the focal plane of an imaging lens. Functionally, FPA-based imaging is accomplished by optically focusing a desired scene on the lattice-like array so that each sensor element images a portion of the scene. The FPA is used in a wide variety of imaging systems.

An inherent limitation on the quality of the resulting images obtained with detector-array imaging systems is spacial nonuniformity in the photoresponse of the detectors in the array, especially when operating in the infrared (IR) domain. The effect is fixed-pattern noise that is superimposed on the true image and that reduces the resolving capability of the imaging system. Additionally, the nonuniformity slowly and randomly drifts over time, which makes solving the problem permanently with an initial calibration of the system very difficult if not impossible.

Moreover, because of manufacturing constraints and varied environmental conditions, the individual detectors of a detector array frequently fail to have identical operating characteristics. Therefore, substantially similar levels of infrared or other em radiation at two different detectors may generate different responses at each of the detectors.

To the extent that two detectors generate different electrical responses upon exposure to the same level of radiation, it may be said that the detectors are displaying "spatial non-uniformity". Spatial non-uniformity between detectors may be caused by one or more of the following factors: fixed pattern noise that includes individual detector offsets, residual gain error in the detectors, fixed pattern electronic noise, and/or non-dithered optical structure in the detectors field of view. So-called pixel offset errors in a detector may be modeled by adding a fixed DC value to the ideal response of each detector, and pixel gain errors in a detector may be modeled by scaling the ideal response in each detector.

Different scene-based nonuniformity correction (NUC) algorithms have been proposed. The proposed algorithm-based techniques typically use a digital image sequence and rely on motion to provide diversity in the irradiance observed by each detector. Some scene-based algorithms in the literature repeatedly compensate for gain and bias nonuniformity. These algorithms rely on the concept of constant statistics, which inevitably requires that, over time, the mean and variance of the irradiances of a scene become spatially invariant.

Other proposed techniques use a statistical algorithm based on the assumption that all detectors in an array are exposed to the same range of collected irradiance within a sequence of frames. This particular technique therefore relaxes the constant-statistics assumption, substituting for it a constant-range assumption. Yet another proposed technique involves motion-based algorithms, which posit that detectors should have an identical response when observing the same portion of a scene at different times. Other proposed techniques are intended to exploit shift information between two consecutive frames in order to apply interpolation. These algebraic approaches, however, generally only correct for offsets.

An alternative approach for correcting fixed pattern noise errors relies on a predetermined calibration of the detector array, the calibration being done at the time of fabrication of the array. This so-called factory-based calibration involves exposing the array to a uniform source and tabulating the response of each detector in the array. The tabulated entries include gain and offset corrections for each detector in the array. The entries in the table may be applied against corresponding detectors to generate a corrected image.

Factory-based calibration, however, generally suffers from multiple drawbacks. First, the pixel offset errors may not be linearly dependent; rather they may have non-linear temperature variations. Thus, factory-based calibration must take place over a broad range of temperatures to perform effectively. Second, this proposed solution typically cannot correct for short-term temporal variations in pixel offset error that occur during operation of the array. For instance, variations in temperature of the detector array can create significant offset variations over time. Finally, factory-based calibration normally requires recalibration to correct for long-term unpredictable changes in pixel offset errors that occur as the array components age.

Yet another proposed alternative solution seeks to mitigate the disadvantages associated with factory-based calibration by calibrating the focal plane array while the array is in use. This can be done by placing a rotating plate in front of the detector array so that the array is alternately exposed to the image under observation and to a signal of known intensity. The fixed pattern noise may then be removed by subtracting a detector's response to the known signal from the detector's response to the observed image. This solution typically has two drawbacks, however. First, by requiring a means for alternately exposing the array to the observed image and to a signal of known intensity, additional complex mechanical or optical elements are typically necessary. Second, by requiring that the focal plane array spend time viewing a signal of known intensity instead of the scene under observation, this solution almost inevitably degrades the array's ability to track fast moving objects and reduces the potential signal to noise ratio of the sensor output.

There thus remains a need for a system and methods that effectively and efficiently address the spatial nonuniformity problem inherent in FPAs and other detector arrays. In particular, there is a need for a system and methods that solve the problem without requiring the addition of unwieldy or inordinately expensive components and whose robustness is not constrained by the assumptions inherent in many of the proposed algorithm-based techniques for addressing the problem.

SUMMARY OF THE INVENTION

The present invention provides a system and methods for providing noise-reduced images using detector arrays. An imaging system according to one embodiment of the present invention can include an image estimation module for generating a plurality estimates of uncorrupted images based upon a plurality of noisy images generated by a detector array. The imaging system further can include a parameter determination module for determining at least one nonuniformity correction parameter based upon the estimates of uncorrupted images.

Another embodiment of the present invention is a method for determining nonuniformity correction parameters for an element of a detector array. The method can include generating a plurality of estimates of uncorrupted images, wherein each of the estimates is generated by fitting a parametric patch model into a neighborhood of noisy image samples. Each of the estimates so generated also uniquely corresponds to one of a plurality of noisy images. The method additionally can include determining at least one nonuniformity correction parameter by fitting a parametric curve to the plurality of estimates and the plurality of noisy images corresponding to each of the estimates.

Still another embodiment of the present invention is a method of updating nonuniformity correction parameters for an element of a detector array. The method can include providing a plurality of noisy image samples and generating a plurality of estimates of uncorrupted images based upon the plurality of noisy image samples and an initial set of correction parameters. Each of the estimates so generated, moreover, can correspond to a unique one of the plurality of noisy images.

The method of updating nonuniformity correction parameters also can include generating a plurality of noise-reduced estimates of uncorrupted images using a set of spatial-neighborhood observations, each of the noise-reduced estimates of uncorrupted images corresponding to a unique one of the estimates of uncorrupted images. The method further can include determining an updated set of correction parameters based upon a predefined mathematical relation between each of the noise-reduced estimates of uncorrupted images and corresponding one of the estimates of uncorrupted images.

As explained more particularly in the following discussion, the procedures effected by the system and methods of the present invention are based upon statistics-based manipulations, the requirements of which are less constraining than the constant-statistics and constant-range assumptions underlying conventional approaches. The procedure effected by the present invention, accordingly, is not only more faster and more efficient, but can be used a wider variety of situations in more diverse contexts.

More particularly, with the present invention, neither the mean nor the variance of the image samples taken at each array element needs to be constant, nor does the range of the irradiance. It is still beneficial, however, that the training sequence provides some diversity in the irradiance for every pixel. Additionally, with the present invention, a lens adjacent a detector array may be intentionally out of focus while recording the test sequence to provide blurred images. The sequence may include relatively few different images in a random order as no motion information is exploited. Finally one beneficial new feature of the out of focus algorithm is its strong robustness to outliers, which are very common in real infrared (IR) systems.

BRIEF DESCRIPTION OF THE DRAWINGS

Other objects, features and advantages of the present invention will become apparent upon reading the following detailed description, while referring to the attached drawings, in which.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. As used in the specification and in the claims, the term "comprising" may include the embodiments "consisting of" and "consisting essentially of."

Figure 1:
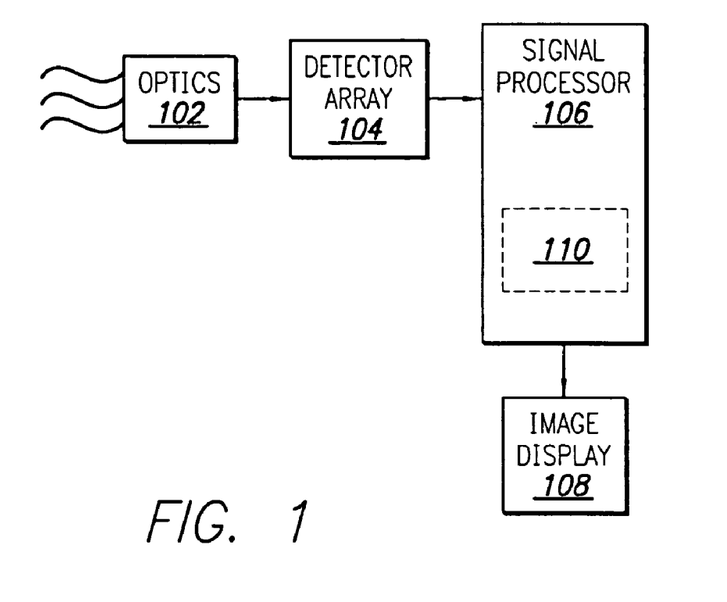
FIG. 1 is a schematic diagram of an exemplary environment in which an imaging system according to one embodiment of the present invention.

FIG. 1 provides a schematic diagram of an exemplary operative environment 100 in which an imaging system according to one embodiment of the present invention can be used. The operative environment 100 illustratively includes an optical device 102 and, adjacent to the optical device, a detector array 104. Additionally, the operative environment 100 illustratively includes a signal processor 106 in electrical communication with the detector array 104. The operative environment 100 also illustratively includes an image display 108 in electrical communication with the signal processor 108.

The optical device 102 receives infrared or other em radiation associated with a scene that is to be imaged and focuses it on the detector array 104. The detector array 104 comprises multiple detectors (not individually shown), each defining an imaging element or pixel, that convert energy from the em radiation into electrical signals. The electrical signals, in turn, are conveyed to the signal processor 106, which processes the signals in generating an image that is displayed on the image display 108.

As will be readily understood by one of ordinary skill in the art, the optical device 102 can comprise, for example, one or more lenses. Each lenses, moreover, can have a flat, concave, or convex surface for different focal lengths. The optical device 102 additionally can include, for example, one or more flat, convex, or concave reflectors for also focusing the desired image. In an alternative embodiment, however, the optical device can be, for example, a camera.

The detector array 104 can be, for example, a focal-plane array (FPA) that comprises infrared or visible-light array elements or pixels. As will be readily apparent to one of ordinary skill in the art, the detector array 104 alternately can be any other device having an array of elements or pixels that convert energy from em radiation into electrical signals that can be processed by the signal processor 106 to form an image of a desired scene or object.

The signal processor 106 can be, for example, a general-purpose or application-specific computing device. Illustratively, the system 110 according to one embodiment of the invention resides on the signal processor 106. In an alternative embodiment, however, the system 110 can be spaced apart from the signal processor 106. When spaced apart from the signal processor 106, the system 110 remains in electrical communication with the signal processor in order to direct the processing of signals received from the detector array 104 according to the procedures described herein.

It will be readily apparent from the ensuing discussion of these procedures effected with the system 110 that the system itself can be implemented in specific hardwired circuitry incorporated into or connected with the signal processor 106. Alternatively, though, the system 110 can implemented in a set of machine-readable instructions to be run of a general-purpose or specific-application computing device. In yet another embodiment, the system 110 can be implemented as a combination of hardwired circuitry and machine-readable code.

Figure 2:
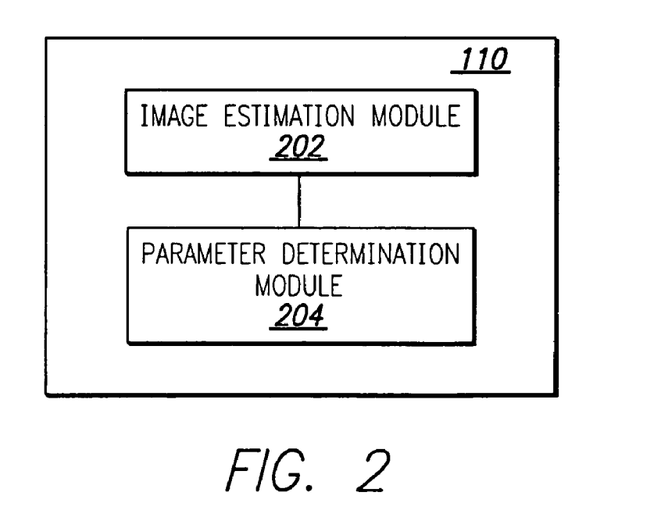
FIG. 2 is a schematic diagram providing a more detailed view of the system illustrated in FIG. 1.

Referring additionally now to FIG. 2, the system 110 illustratively comprises an image estimation module 202 and a parameter determination module 204 in electrical communication with one another. Each module can be independently implemented in hardwired circuitry, machine-readable code, or a combination of both.

According to one particular embodiment, the image estimation module 202 generates a plurality of estimates of uncorrupted images by fitting a parametric patch model (defined below) into a neighborhood of noisy image samples such that each estimate uniquely corresponds to one of a plurality of noisy images. As used herein, the term neighborhood defines a set of elements within a predetermined distance from a particular element of interest. Accordingly, the neighborhood of noisy image samples comprises a sample of noisy images generated by array elements or pixels of the detector array 104 that are each within a predetermined distance from a particular element or pixel of interest.

The parameter determination module 204 then determines at least one nonuniformity correction parameter by fitting a parametric curve to the plurality of estimates and the plurality of noisy images corresponding to each of the estimates.

Figure 3:
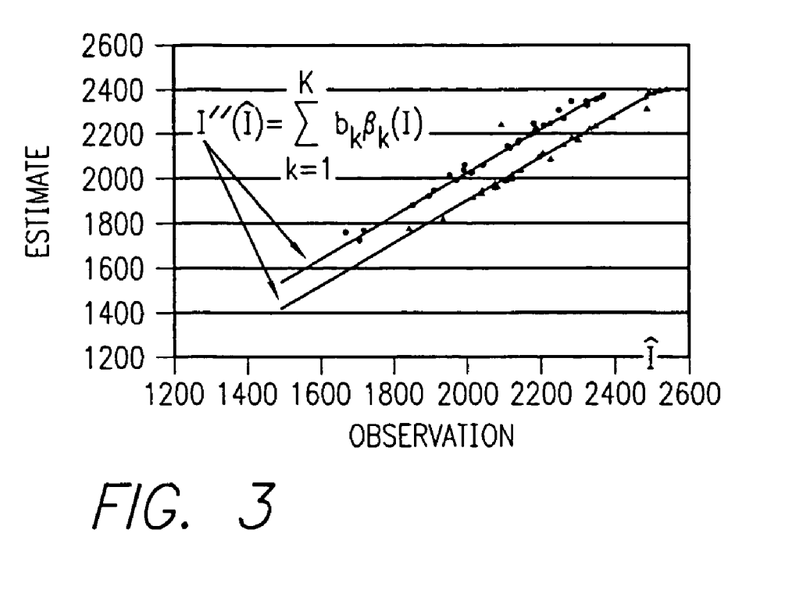
FIG. 3 is a graphical representation of model fitting performed as an aspect of the procedure effected by an imaging system according to another embodiment of the present invention.

Generally for each element of the detector array 104, as with other such detector arrays, there is an underlying quantitative relation between an uncorrupted or noise-free image intensity value, I, and a corresponding observation, Î, generated by the detector at a particular element, the element being designated in a two dimensional vector space by the vector <x, y>. In order to fully appreciate the underlying algorithmic procedure implemented with the image generation module 202 and the parameter determination module 204, it is helpful to understand this underlying quantitative relation. The relationship may be represented by a linear function such as the following:

$$I_{x,y} = O_{x,y} + G_{x,y} \hat{I}_{x,y} \qquad (1)$$

where $O_{x,y}$ is an offset parameter and $G_{x,y}$ is a gain parameter. FIG. 3 shows an example of an element of a detector array where observations and their estimates are mapped by a fitted line. For more accuracy, especially with wide-range cameras, for example, the noise model underlying the operation of the modules 202, 204 may be extended to include parameters of higher order. Equation (1) may thus be formulated more generally:

$$I_{x,y} = \Sigma b_k \hat{I}^k_{x,y} \qquad (2)$$

where the sum ($\Sigma$) is from k=0 to K. The image estimation and parameter determination modules 202, 204 implement an algorithmic procedure in which the parameters $b_k$ may be assumed to be statistically independent and normally distributed. Deviations from this condition may be compensated by a robust fitting procedure that copes with outliers.

The algorithm-based procedure implemented with the image estimation and parameter determination modules 202, 204 uses additional information that can be gained from out-of-focus images captured with the detector array 104, the information being based upon the strong correlation among intensity values in a local neighborhood or portion of an image. The true spatial intensity gradient in those images is expected to change only gradually throughout the neighborhood of the image. The superimposed noise, however, adds a high frequency component to the underlying smooth changing image values. The algorithmic procedure implemented with the image estimation and parameter determination modules 202, 204 improves the image generated with the detector array 104 by extracting correction parameters for each element or pixel of the detector array 104 as explained herein.

In so far as the following discussion refers to a particular element, <$x_o$, $y_o$>, of the detector array 104, the indices can be suppressed for the ease of presentation and discussion. The procedure described in the context of one particular element pertains equally to all of the other elements of the detector array 104.

Turning now to the algorithmic procedure, the parametric patch model that is fitted into a neighborhood of noisy image samples by the image estimation module 202 is described mathematically as follows:

$$I'(i, j) = \Sigma a_k \alpha_k(i, j) \quad i, j \in 1 \ldots N \qquad (3)$$

where I'(i, j) is fitted into a neighborhood of N×N noisy image samples and the sum ($\Sigma$) is from k=1 to M. The $a_k$ are parameters and the $\alpha_k$ are basis functions of the patch model. For example, in the case of a $2^{nd}$ order model (3) becomes:

$$I'(i, j) = a_1 + a_2 i + a_3 j + a_4 i^2 + a_5 ij + a_6 j^2 \qquad (4,$$

Figure 4:
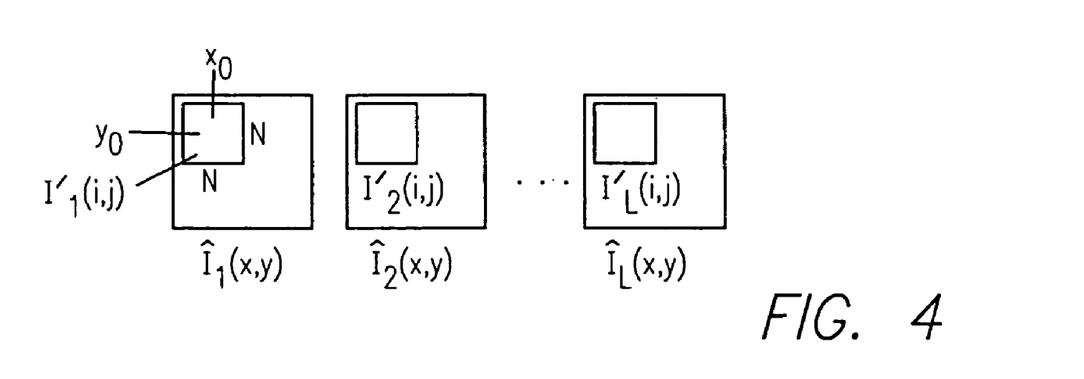
FIG. 4 is a graphical representation curve fitting performed as an aspect of the procedure effected by an imaging system according to still another embodiment of the present invention.

Assuming the noise inside a corresponding neighborhood is normally distributed around the true values, then an adaptive weighted least-square fit of a low-order patch model into the noisy data will align the model along the true values, mitigating or eliminating noise. The fitted pixel in the middle of the neighborhood I'(N/2, N/2) is then used as an estimate for the uncorrupted value at this position. However the resulting offset, which means the difference between the fitted and the observed value, is usually not constant but depends on the irradiance and on the varying characteristics of each element of the detector array 104. To determine the relationship between the observations and their corresponding estimates for a certain element in the array, the patch fitting procedure may be repeated on a plurality of images from 1 to L, with observations preferably obtained at different levels. The patch fitting procedure is graphically illustrated by the series of frames in FIG. 4.

The resulting pairs of noisy images and estimates of uncorrupted images, $(\tilde{I}_1, I'_1) \ldots (\tilde{I}_L, I'_L)$, are used subsequently during the portion of the algorithmic procedure implemented with the parameter determination module 204. More particularly, the parameter determination module 204 fits a parametric curve $I''(\tilde{I})$ through the data pairs generated by the image estimation module 202. The parameters of the fitted curve represent the final correction terms or, more particularly, accurately updated nonuniformity correction parameters based on all observations at the position x,y.

The numerical fitting techniques used in the algorithm-based procedure may be, in one embodiment, a standard least-squares procedure as described in the literature. The subject of robust fitting based on weights can be also found in the literature. The algorithmic procedure can be based on facet and curve fitting techniques according to one particular embodiment of the present invention. More particularly, according to this embodiment, the image estimation module 202 utilizes a facet fitting technique, and the parameter determination model utilizes a curve fitting technique.

Firstly, with regard to the facet fitting technique, a fitted surface model I'(i, j) with i, j ∈ 1 . . . N approximating the true pixel intensity around a given position x,y may be mathematically represented as follows:

$$I'(i,j) = a_1 \alpha_1(i,j) + \ldots + a_M \alpha_M(i,j) \quad (5)$$

The $\alpha_k$ are the M model functions and the $a_k$ are corresponding coefficients. This model may be fitted into the noisy data using the least-squares procedure which minimizes a merit function $F(\tilde{I}, a)$. In terms of a matrix representation, the merit function is:

$$F(\tilde{I}, a) = (\tilde{I} - Aa)^T \sum_I^{-1} (\tilde{I} - Aa) \quad (6)$$

Vector $\tilde{I} \in R^{NN \times 1}$ holds all of the observed samples from a neighborhood written column by column:

$$\tilde{I}^T = (\tilde{I}_{1,1} \ldots \tilde{I}_{1,N} \ldots \tilde{I}_{N,1} \ldots \tilde{I}_{N,N})^T \quad (7)$$

$A \in R^{NN \times M}$ is a matrix with the model functions evaluated at every position in the neighborhood:

$$A = \begin{matrix} \alpha_1(1,1) \ldots \alpha_M(1,1) \\ \alpha_1(1,N) \ldots \alpha_M(1,N) \\ \alpha_1(N,N) \ldots \alpha_M(N,N) \end{matrix} \quad (8)$$

Finally, $\Sigma_I^{-1} \in R^{NN \times NN}$ is the inverse covariance matrix of the observed signal. As the covariance is unknown, using only the diagonal elements will transform (6) into the $X^2$ function:

$$X^2 = \Sigma(i=1 \text{ to } N)\Sigma(i=1 \text{ to } N)((\tilde{I}_{i,j} - I'(i,j))/\sigma_{i,j})^2 \quad (9)$$

with $$\sum_I^{-1} = \begin{matrix} 1/\sigma^2_{1,1} & 0 & \ldots & 0 \\ 0 & 1/\sigma^2_{2,2} & 0 & 0 \\ \ldots & \ldots & \ldots & \ldots \\ 0 & 0 & \ldots & 1/\sigma^2_{N,N} \end{matrix} \quad (10)$$

The problem of unknown $\sigma_{i,j}$ can be approached by initially assigning all the values to 1 and then using an iterative robust fitting method that calculates weights $w_{i,j}$ as estimates for $1/\sigma^2_{i,j}$. In this case the bi-square weighted algorithm may be implemented. Using weights also solves the problem of outliers that may significantly distort the fit.

For iterative fitting, the first step is to fit the model using linear least-squares. Next, at each iteration t, new residuals $\tau_{i,j}$ and associated weights $w_{i,j}$ may be calculated:

$$w_{i,j} = [1 - (\tau_{i,j}/k)^2]^2 \text{ for } |\tau| \leq k$$

$$w_{i,j} = 0 \text{ for } |\tau| > k \quad (11)$$

Choosing, for example, the tuning constant $k = 4.685\sigma$ provides a 95-percent efficiency in comparison to the optimal linear least-squares fitting when the errors are normal, and still offers protection against outliers. Instead of calculating $\sigma$, a robust measure of spread is employed: $\sigma = MAR/0.6745$, where MAR is the median absolute residual. Lastly, the new weighted least-squares estimates may be solved. The final two steps may then be repeated until the estimated coefficients converge.

The solution for the patch parameters is then given by:

$$a = \left(A^T \sum_I^{-1} A\right)^{-1} A^T \sum_I^{-1} \tilde{I} \quad (12)$$

Knowing $a_1 \ldots a_M$ allows the extraction of the point in the middle of the patch I'(N/2,N/2) and use it as an estimate for the true intensity value at the position x,y corresponding to the observation $\tilde{I}$. Pairs of noisy observations $\tilde{I}_I$, and their estimates $I'_I$, from each training frame $I \in 1 \ldots L$ are the data for the second algorithm step.

Additionally, a measure of the goodness-of-fit may be calculated:

$$(\sigma')^2 = 1/N^2 \Sigma(j=1 \text{ to } N)\Sigma(i=1 \text{ to } N)(I'(i,j) - \tilde{I}_{i,j})^2 \quad (13)$$

The surface curve fitting step may be repeated on a number L of different images. The result is L vectors of observed $\tilde{I}$, estimated I' intensities values and estimated uncertainty $(\sigma')^2$. For the array element or pixel x,y in the image, the following is obtained:

$$I'^T = (I'_1 I'_2 \ldots I'_L)^T$$

$$\tilde{I}^T = (\tilde{I}_1 \tilde{I}_2 \ldots \tilde{I}_L)^T$$

$$(\sigma')^{2T} = ((\sigma_1')^2 (\sigma_2')^2 \ldots (\sigma_L')^2)^T$$

The L vectors of observed $\tilde{I}$, estimated I' intensities values and estimated uncertainty $(\sigma')^2$ are used by the parameter determination module 204 to fit the parametric curve to the plurality of estimates and plurality of noisy images. The curve model that is fitted may be written as:

$$I''(\hat{I}) = \Sigma b_k \beta_k(\hat{I}) \quad (14)$$

where the sum ($\Sigma$) is from k=0 to K. In case of a linear noise model, the parameter $b_1$ represents the offset and $b_2$ the gain. The model functions $\beta_1$ and $\beta_2$ are then:

$$\beta^\tau = (1\ \hat{I})^\tau \quad (15)$$

As in the previous surface fitting step, the weighted least-squares procedure is applied to fit the curve. The coefficients $b_k$ are estimated by minimizing the merit function:

$$F(I', b) = (I' - Bb)^T \sum_{I'}^{-1} (I' - Bb) \quad (16)$$

With $B \in R^{L \times N}$ containing the basis functions evaluated at each distinct position $\hat{I}_1 \ldots \hat{I}_L$:

$$B = \begin{matrix} \beta_1(\hat{I}_1) \ldots \beta_K(\hat{I}_1) \\ \ldots \\ \beta_1(\hat{I}_L) \ldots \beta_K(\hat{I}_L) \end{matrix} \quad (17)$$

$\Sigma_{I'}^{-1} \in R^{L \times L}$ is the inverse covariance matrix that may be approximated using variances of $\sigma'^2_k$ from the previous plane fitting step as described in (13):

$$\sum_{I'}^{-1} = \begin{matrix} 1/\sigma'^2_1 & 0 & \ldots & 0 \\ 0 & 1/\sigma'^2_2 & \ldots & 0 \\ \ldots & \ldots & \ldots & \ldots \\ 0 & 0 & \ldots & 1/\sigma'^2_L \end{matrix} \quad (18)$$

The noise parameters may then be found by solving:

$$b = \left(B^T \sum_{I'}^{-1} B\right)^{-1} B^T \sum_{I'}^{-1} I' \quad (19)$$

As an example, assume a training sequence images is provided. The images can be such that each pixel would be exposed to a certain range of intensities. These images can then be blurred to simulate the out-of-focus condition. Finally fixed pattern nonuniformity with two parameters for offset and gain respectively can be added to each pixel x,y in the images:

$$\hat{I} = O_{x,y} + G_{x,y} I \quad (20)$$

The correction parameters can be calculated using neighborhoods of different size. The patch model used to obtain estimates from local neighborhood can be, for example, a $2^{nd}$ order polynomial:

$$I'(i,j) = a_1 + a_2 i + a_3 j + a_4 i^2 + a_5 ij + a_6 j^2 \quad (21)$$

Finally, a linear function can be chosen for the curve fitting step to find the coefficients for offset and gain.

$$I''(\hat{I}) = b_1 + b_2(\hat{I}) \quad (22)$$

The algorithm can be repeatedly applied to the training sequence with different spatially fixed patterns for each test run. In actual simulations conducted by the inventors, the coefficients for offset and gain representing the distortion were samples from Gaussian distributions $N(\mu, \sigma)$:

$$N_O(0, 10), N_G(1, 0.1). \quad (23)$$

The statistics of the calculated parameters were found to be very close to those of the original coefficients.

According to another embodiment, the image estimation module 202 generates a plurality of estimates of uncorrupted images based upon a plurality of noisy image samples and an initial set of correction parameters. Each of the estimates of uncorrupted images is generated so as to correspond to a unique one of the plurality of noisy images. The image estimation module 202, according to this particular embodiment, further generates a plurality of noise-reduced estimates of uncorrupted images using a set of spatial-neighborhood observations. Each of the noise-reduced estimates of uncorrupted images is generates so as to correspond to a unique one of the estimates of uncorrupted images.

Further, according to this embodiment, the parameter determination module 204 determines an updated set of correction parameters. The updated correction parameters, more particularly, are determined by the parameter determination module 204 on the basis of a predefined mathematical relation between each of the noise-reduced estimates of uncorrupted images and a corresponding one of the estimates of uncorrupted images.

The procedures implemented according to this embodiment are used to rapidly obtain an updated nonuniformity correction parameter using an iterative scene-based technique that is robust to bad elements or pixels that may occur in the detector array 104. The statistical requirements for this procedure are also less restrictive than the constant-statistics or the constant-range conditions underlying conventional algorithms. Again, the procedure according to this embodiment does not require that either the mean or variance of the samples at each detector element be constant, nor does the range of the irradiance have to be constant.

Nonetheless, it is still beneficial that the imaging sequence provides some diversity in the irradiance for each element or pixel of the detector array 104. Note also that if the optical device 202 includes a lens, the focus of the lens may be reduced while recording the test sequence so as to provide blurred images. The sequence may include relatively few different images in a random order as no motion information is exploited. A short training sequence makes the computation of the correction parameters quite fast. At the same time, a malfunctioning detector element can be detected and marked, which is necessary before further image processing such as edge detection is carried out on the image. Finally the iterative approach described herein addresses spatially-correlated nonuniformity.

The relation between the true intensity value I and the observation $\hat{I}$ at a certain position x,y in the sensor can, again, be approximated with a linear function:

$$I_{x,y} = O_{x,y} + G_{x,y} \hat{I}_{x,y} \quad (24)$$

The procedure implemented by the modules 202, 204 according to this embodiment determines the parameters O and G representing, respectively, the offset and gain needed to correct the image obtained with the detector array 104.

The algorithmic procedure according to this embodiment makes a quick update of the nonuniformity correction in the focal-array plane images. More particularly, it is an iterative scene-based technique that is robust to bad pixels, as noted above. Only a few out of focus images are used for the training sequence, which makes the calculation of the correction coefficients relatively fast as compared to conventional techniques.

The algorithm calculates the offset $O_{x,y}$ and gain $G_{x,y}$ for each element or pixel of the detector array 104 based on the training sequence with L noisy, out-of-focus images $\hat{I}^l$, $l \in 1 \ldots L$. The calculation can be accomplished in iterative steps, with each iteration improving the calculation of the parameters at each step until they converge. For better understanding, the correction procedure will be described for only one particular element, <x,y>, in the array as it is being repeated for every other position in the same way.

Using a current correlation parameters $O_n$ and $G_n$, where n denotes the iteration step, the image generation module corrects the training sequence by generating a plurality of estimates of uncorrupted images based upon a plurality of noisy image sample and initial set of correction parameters. If in initial set of correction parameters does not already exist, then an initial offset coefficients for the first iteration (n=1) are independently set, the offset being set equal to 0 and the gain coefficients to 1:

$$\tilde{I}^n = O_n + G_n \hat{I} \quad (25)$$

Next, using corrected images $\tilde{I}^n$, estimates I' for the undistorted irradiance (i.e., estimates of uncorrupted or noise-free images) are obtained for a local neighborhood. The noisy out of focus images have the property that the local gradient around a certain position is expected to be homogeneous. As the superimposed noise randomly distorts the smoothness in the observed values, the neighborhood information around <x,y> can be used to estimate the expected undistorted value $I'_{x,y}$ of a pixel in each frame I; that is, a set of noise-reduced estimates of the uncorrupted images can be obtained. This can be accomplished, for example, by taking a weighted average. For example, using four equally weighted neighborhood values, the mean of the four neighboring values is:

$$I'_{x,y} = \frac{1}{4}(\tilde{I}_{x-1,y} + \tilde{I}_{x+1,y} + \tilde{I}_{x,y-1} + \tilde{I}_{x,y+1}) \quad (26)$$

The result is L pairs of observations from the latest correction and their corresponding improvements $(\tilde{I}^1, I'^1) \ldots (\tilde{I}^L, I'^L)$. Improvement, here, denoting a further reduction in the noise associated with the image.

Using, in one embodiment, a robust least-squares procedure, a line is then fitted into the L pairs of data:

$$I''(\tilde{I}) = O' + G'\tilde{I} \quad (27)$$

Figure 5:
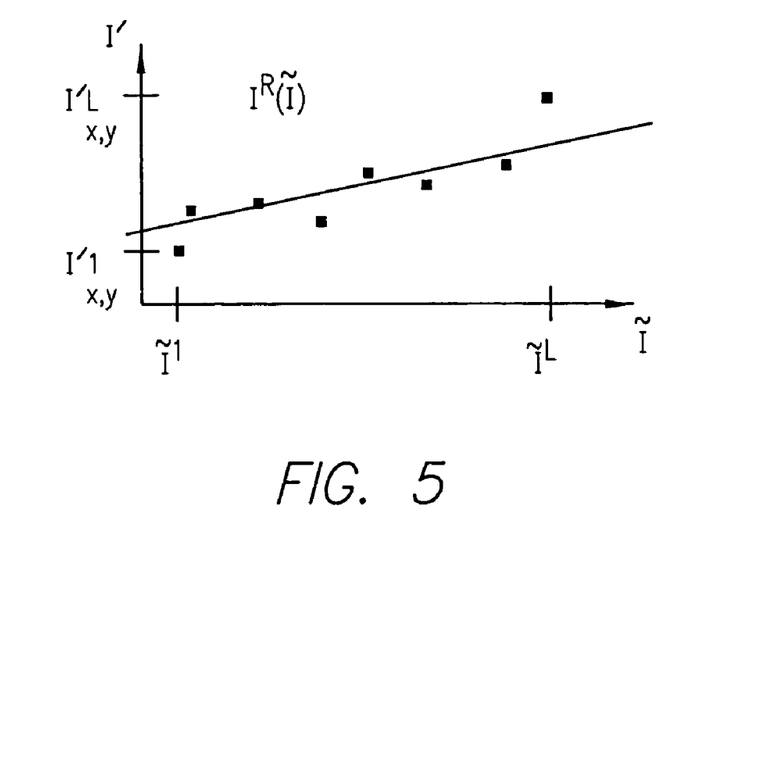
FIG. 5 is a graphical representation of curve fitting performed as an aspect of the procedure effected by an imaging system according to yet another embodiment of the present invention.

An exemplary line fit, according to this embodiment, is illustrated in FIG. 5.

According to still another embodiment, a damping constant, d, can be applied to the updated values of the offset and gain to thereby mitigate or prevent oscillation:

$$O' = dO'$$

$$G' = d(G' - 1) + 1 \quad (28)$$

The damping constant may be set to a value between 0 and 1 with small values resulting in strong damping but slow improvement of the correction parameters.

As O' and G' are being calculated on an already corrected sequence, they are not the final correction parameters, but rather updates for the overall $O^{n+1}$ and $G^{n+1}$.

$$O^{n+1} = O' + O''G'$$

$$G^{n+1} = G'G^n \quad (29)$$

The algorithmic procedure implemented by the modules 202, 204 according to this embodiment can additionally be utilized for correcting faulty element or bad pixels in the detector array 104. Malfunctioning elements or pixels can be categorized into three groups.

(1) completely damaged—these elements do not react to irradiance at all. The observed value is always 0 or at least static in all images.

(2) random values—some elements behave in a random manner. The observations show very little or no analogy to the true intensity values. It is also possible that the observations are inverse proportional to the irradiance, which is clearly a malfunction that needs to be marked.

(3) occasional failure—the last category includes elements that work fine (or most of the time, but fail occasionally. This results in wrong observations in only few discrete frames.

There are also array elements or pixels of the detector array 104 that have a much higher offset than do their neighbors. They appear to be malfunction elements or pixels, but in fact they may be corrected as long as they operate within a certain range. If the range is exceeded, the observations of these pixels are mapped to the maximum or minimum value and may not be restored while other elements can still deliver reasonable results.

The algorithm-based procedure implemented by the modules 202, 204 according to this embodiment may mark those array elements or pixels that are completely damaged and that yield inverse proportional values that have a negative gain. This is done during an initial iterate step of the algorithmic procedure. During this calculation, the line fitting procedure is used to detect bad pixel. The damaged element maps every estimate extracted from its neighborhood to a constant value. It results in a singular matrix, which because it can not be inverted makes the least-squares fit impossible. Array elements or pixels of the detector array 104 that have a negative gain are also marked as bad. The array elements or pixels so marked may then be skipped during the execution of the algorithmic procedure by the modules 202, 204 such that the marked pixels do not contribute to other estimates.

There may still be elements or pixels of the detector array 104, however, that exhibit random errors. If this is the case in the training sequence, their contribution should be suppressed. This is done according to one embodiment using a robust line fitting technique that applies weights to all L pairs of observed and estimated values used for the fit. If an estimate was based on a bad value, its contribution to the overall data will be decreased or even ignored.

The robust fitting implemented, moreover, may be a least-squares procedure based on M-estimates. In one embodiment, the Turkey bisquare option may be implemented. The data for the line fit is provided by the L pairs of estimated and observed values from a particular element x,y in all frames of the training sequence. The subscript x,y at every $\tilde{I}_{x,y}$, $I'_{x,y}$ and $I''_{x,y}$ will be abandoned and I will be used instead as a frame index.

$$(\tilde{I}^1, I'^1) \ldots (\tilde{I}^L, I'^L) \quad (30)$$

The line defined in (30) is fitted by minimizing the sum of weighted square errors between the model and the L data samples:

$$X^2 = \Sigma w_I(I'_I - I''I(\tilde{I}_I))^2 = \Sigma w_I(\tau_I)^2 \quad (31)$$

wherein the sums (Σ) are from I=1 to L. The weights $w_I$ correspond to each pair of data. The have to be calculated iteratively depending on the residuals $\tau_I$.

For iterative fitting, linear least-squares is used to fit the model. Then, at each iteration, t, new residuals $\tau_I$ and associated weights $w_I$. are calculated according to the following equations:

$$w_I = [1-(\tau_I/k)^2]^2 \text{ for } |\tau| \leq k$$

$$w_I = 0 \text{ for } |\tau| > k \quad (32)$$

Choosing, for example. in one embodiment, the tuning constant k=4.685σ provides a 95-percent efficiency in comparison to the optimal linear least-squares fitting when the errors are normal. Yet it still offers protection against outliers. Instead of calculating σ a robust measure of spread is employed: σ=MAR/0.6745, where MAR is the median absolute residual. Lastly, the new weighted least-squares estimates may be solved. The final two steps may then be repeated until the estimated coefficients converge. Once the weights are set, the solution to the least-squares problem may be found using any standard procedure provided in the literature.

Due to the iterative character of the algorithm, some patterns of distortion may cause the correction coefficients to oscillate, as alluded to above. A one dimensional example of the oscillations is provided in FIG. 6. The estimates in this embodiment would be obtained by taking the mean of two neighboring values:

$$I'_x = \tfrac{1}{2}(I_{x-1} + I_{x+1}) \quad (33)$$

Figure 6:
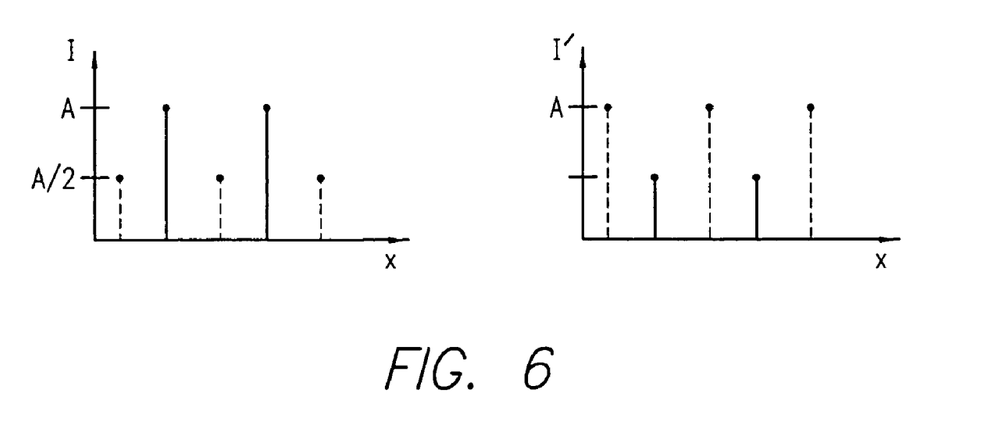
FIG. 6 is a graphical representation of the effect of oscillations of coefficients addressed by an imaging system according to still another embodiment of the present invention.

As a result, after one iterative step, the input samples are inverted. This combination may oscillate for a long number of iterations until it will be damped by corrected samples that are further away. To overcome this drawback, a damping constant d, which is set to a value between 1 (no damping) and 0 (full damping, no correction) may be applied to the correction coefficients after every iteration.

$$O''_{x,y} = dO''_{x,y}$$

$$G''_{x,y} = d(G''_{x,y} - 1) + 1 \quad (34)$$

Figure 7:
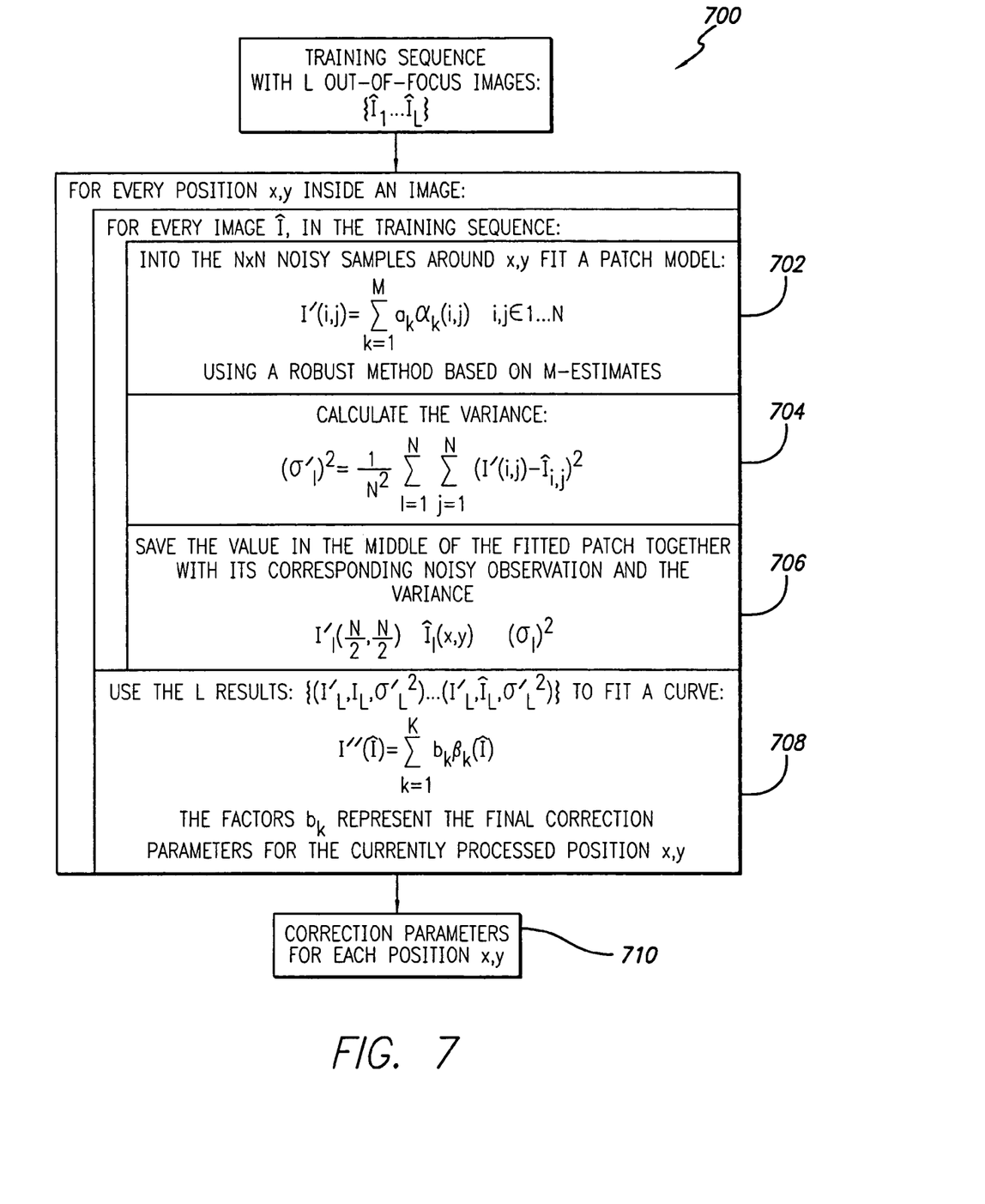
FIG. 7 is a method of determining nonuniformity correction parameters for an element of a detector array according to yet another embodiment of the present invention.

Still another embodiment of the present invention is a method for determining nonuniformity correction parameters for an element of a detector array as illustrated by the flowchart of FIG. 7. The method 700 illustratively includes at step 702 generating a plurality of estimates of uncorrupted images. More particularly, each of the estimates is generated by fitting a parametric patch model into a neighborhood of noisy image samples. Each of the estimates uniquely corresponds to one of a plurality of noisy or out-of-focus images that define a training sequence. Illustratively, the method further includes, at step 704, determining one or more nonuniformity correction parameters. The one or more correction parameters is determined by fitting a parametric curve to the plurality of estimates of uncorrupted images and the plurality of noisy images, each noisy image corresponding to a unique one of the estimates.

As described above, according to one embodiment, the fitting of the model optionally includes at step 704 calculating a variance among the estimates of the uncorrupted images and their corresponding noisy images. The method optionally includes at step 706 saving a value in the middle of the fitted patch together with its corresponding noisy image and the variance computed in the previous step. Note that as illustrated, each image in the training sample is used in the procedure and that the procedure can be repeated for each element or pixel position inside an image.

Figure 8:
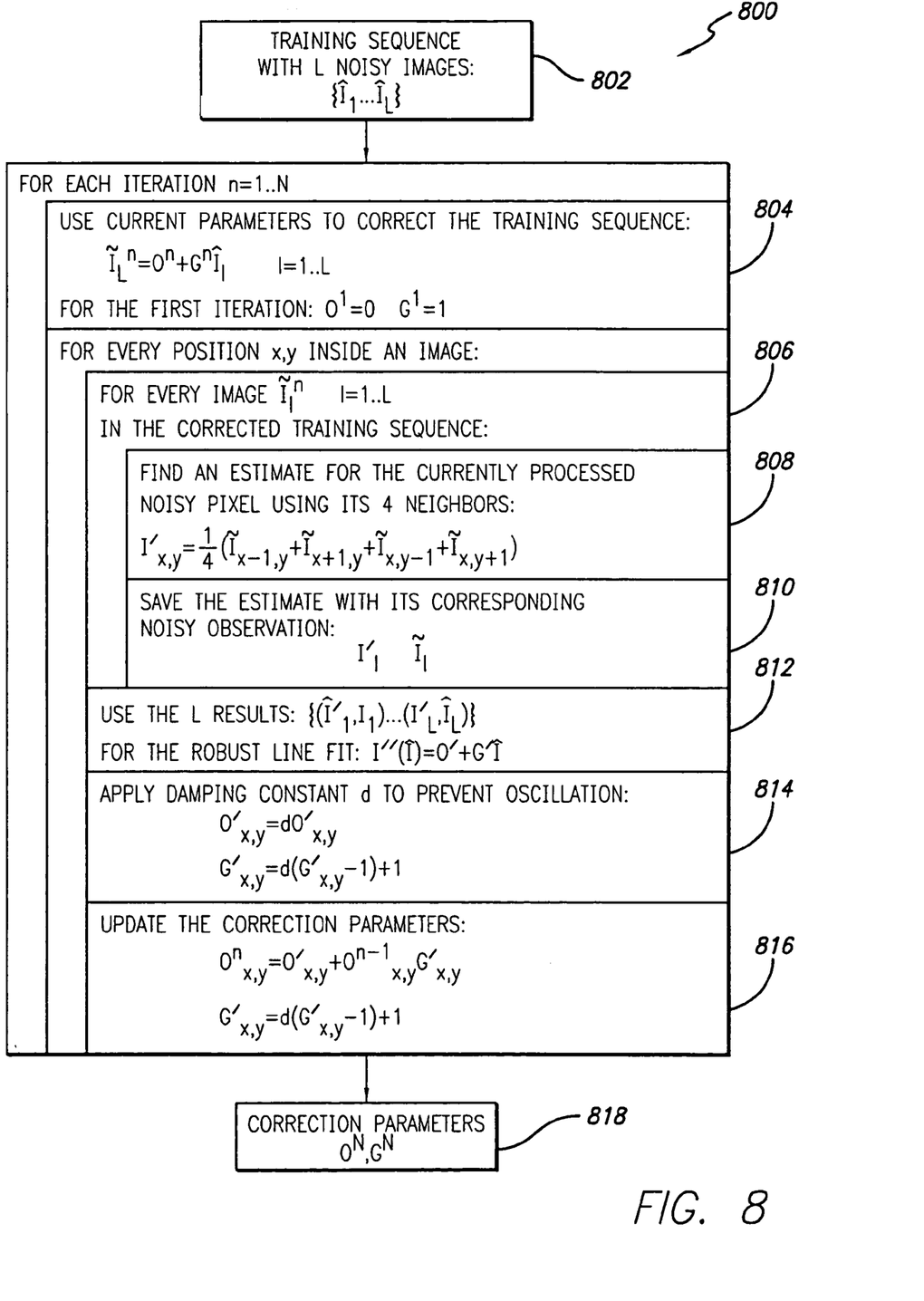
FIG. 8 is a method of updating nonuniformity correction parameters for an element of a detector array according to still another embodiment of the present invention.

Still another embodiment of the present invention is method of updating nonuniformity correction parameters for an element of a detector array. The method 800 is illustrated by the flowchart of FIG. 8. The method illustratively includes providing a plurality of noisy image samples at step 802. The noisy image samples define a training sequence. Additionally, at step 804, the method illustratively includes generating a plurality of estimates of uncorrupted images based upon the plurality of noisy image samples and an initial set of correction parameters, each of the estimates of uncorrupted images corresponding to a unique one of the plurality of noisy images. The estimates define a corrected or noise reduced sequence.

At step 806, the method proceeds with the generation of a plurality of noise-reduced estimates of uncorrupted images using a set of spatial-neighborhood observations, each of the noise-reduced estimates of uncorrupted images corresponding to a unique one of the estimates of uncorrupted images. According to one embodiment, the noise reduction is effected by optionally computing at step 808 a weighted average based upon the set of spatial-neighborhood observations. Each noise-reduced estimate is optionally saved with its corresponding noisy image at step 810.

The method continues at step 816 with the determination of an updated set of correction parameters based upon a predefined mathematical relation between each of the noise-reduced estimates of uncorrupted images and corresponding one of the estimates of uncorrupted images. More particularly, according to one embodiment, the updated set of correction parameters can be determined from the parameters generated at step 812 by the fitting of a line to each pair comprising a noise-reduced estimate and its corresponding noisy image. To prevent, oscillation a recursive relation between a currently determined set of updated correction parameters and a previously determined set of updated correction parameters can optionally be constructed at step 814. In an iterative fashion, successive updates of the correction parameters can be effected according to the recursive relation illustrated in step 816. When convergence of the iteratively updated parameters is achieved the updated correction parameters are outputted at step 818.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A method for determining nonuniformity correction parameters for a detector array, the method comprising the steps of:

for each element of the detector array, generating a plurality estimated and observed intensity pairs, wherein the estimated intensities for each element is calculated based upon corresponding observed intensities for that element;

generating a plurality of estimates of uncorrupted images, each of the estimates being generated by fitting a parametric patch model to the plurality estimated and observed intensity pairs for a neighborhood of noisy image samples, each uncorrupted image uniquely corresponding to one of a plurality of noisy images; and determining at least one nonuniformity correction parameter by fitting a parametric curve to the plurality of estimates and the plurality of noisy images corresponding to each of the estimates;

identifying whether one or more elements of the detector array is faulty based upon the fitted parametric model and, if at least one detector is determined to be faulty, suppressing the output of the at least one faulty detector.

2. The method of claim 1, wherein the parametric patch model comprises a second-order model.

3. The method of claim 1, wherein fitting the parametric patch model comprises minimizing a predefined merit function using a least-squares procedure.

4. The method of claim 3, wherein the predefined merit function expresses a mathematical relationship between the plurality of noisy images and a plurality of parametric patch models, the mathematical relationship being defined by a coefficient matrix and an inverse covariance matrix.

5. The method of claim 1, wherein fitting the parametric curve comprises minimizing a predefined merit function using a least-squares procedure.

6. The method of claim 5, wherein the predefined merit function expresses a mathematical relationship between the plurality of estimates and the plurality of noisy images corresponding to each of the estimates, the mathematical relationship being defined by coefficient matrix and an inverse covariance matrix.

7. A method of updating nonuniformity correction parameters for a detector array, the method comprising the steps of:

(a) providing a plurality of noisy image samples;

(b) for each element of the detector array, generating a plurality estimated and observed intensity pairs, wherein the estimated intensities for each element is calculated based upon corresponding observed intensities for that element, and generating a plurality of estimates of uncorrupted images by fitting a curve to the plurality of estimated and observed intensity pairs for the plurality of noisy image samples and an initial set of correction parameters, each of the estimates of uncorrupted images corresponding to a unique one of the plurality of noisy images;

(c) generating a plurality of noise-reduced estimates of uncorrupted images using a set of spatial-neighborhood observations, each of the noise-reduced estimates of uncorrupted images corresponding to a unique one of the estimates of uncorrupted images; and (d) determining an updated set of correction parameters based upon a predefined mathematical relation between each of the noise-reduced estimates of uncorrupted images and corresponding one of the estimates of uncorrupted images, identifying whether one or more elements of the detector array is faulty based upon the fitted curve, and, if at least one detector is determined to be faulty, suppressing the output of the at least one faulty detector.

8. The method of claim 7, further comprising the step of:

(e) setting the initial set of correction parameters equal to the updated set of correction parameters and repeating steps (a) through (d) to determine a different set of update correction parameters if the updated set of correction parameters and a previously determined updated set of correction parameters does not converge.

9. The method of claim 7, wherein the plurality of correction parameters comprises an offset parameter and a gain parameter.

10. The method of claim 7, wherein the step of generating a plurality of noise-reduced estimates of uncorrupted images comprises computing a weighted average of the set of spatial-neighborhood observations.

11. The method of claim 7, wherein the step of determining an updated set of correction parameters is based upon a linear relationship between each of the noise-reduced estimates of uncorrupted images and corresponding one of the estimates of uncorrupted images.

12. The method of claim 11, wherein the linear relationship is determined using a robust least-squares procedure.

13. The method of claim 7, wherein the step of determining the updated set of correction parameters further comprises determining the updated set of correction parameters based upon a predetermined set of damping coefficients.

14. The method of claim 13, wherein the damping coefficients define a recursive relation between a currently determined set of updated correction parameters and a previously determined set of updated correction parameters.

15. The method of claim 7, further comprising the step of:

(f) determining when the element of the array fails to function accurately.

16. The method of claim 15, further comprising the step of:

(g) suppressing a contribution of the element of the array to the determination of correction parameters if the element of the array is determined to be functioning inaccurately.

17. An imaging system for imaging a scene with a detector array having an array of imaging elements, the system comprising:

an image estimation module for generating a plurality estimates of uncorrupted images based upon a plurality of noisy images generated by the detector array, wherein the image estimation module is configured to generate a plurality estimated and observed intensity pairs for each element of the detector array, the estimated intensities for each element being calculated based upon a corresponding observed intensities for that element, and to generate the estimates of the uncorrupted images by fitting a curve to the plurality of estimated and observed intensity pairs; and a parameter determination module for determining at least one nonuniformity correction parameter based upon the estimates of uncorrupted images.

18. The imaging system of claim 17, wherein the image estimation module generates the plurality of estimates of uncorrupted images by fitting a parametric patch model into a neighborhood of noisy image samples such that each estimate and uniquely corresponds to one of a plurality of noisy images; and wherein the parameter determination module determines at least one nonuniformity correction parameter by fitting a parametric curve to the plurality of estimates and the plurality of noisy images corresponding to each of the estimates.

19. The imaging system of claim 17, wherein the image estimation module generates a plurality of estimates of uncorrupted images based upon a plurality of noisy image samples and an initial set of correction parameters, each of the estimates of uncorrupted images corresponding to a unique one of the plurality of noisy images; and wherein the image estimation module further generates a plurality of noise-reduced estimates of uncorrupted images using a set of spatial-neighborhood observations, each of the noise-reduced estimates of uncorrupted images corresponding to a unique one of the estimates of uncorrupted images.

20. The imaging system of claim 19, wherein the parameter determination module determines an updated set of correction parameters based upon a predefined mathematical relation between each of the noise-reduced estimates of uncorrupted images and corresponding ones of the estimates of uncorrupted images.

* * * * *